J. W. PALMER.
Bee Hive.
No. 25,979.
Patented Nov. 1, 1859.
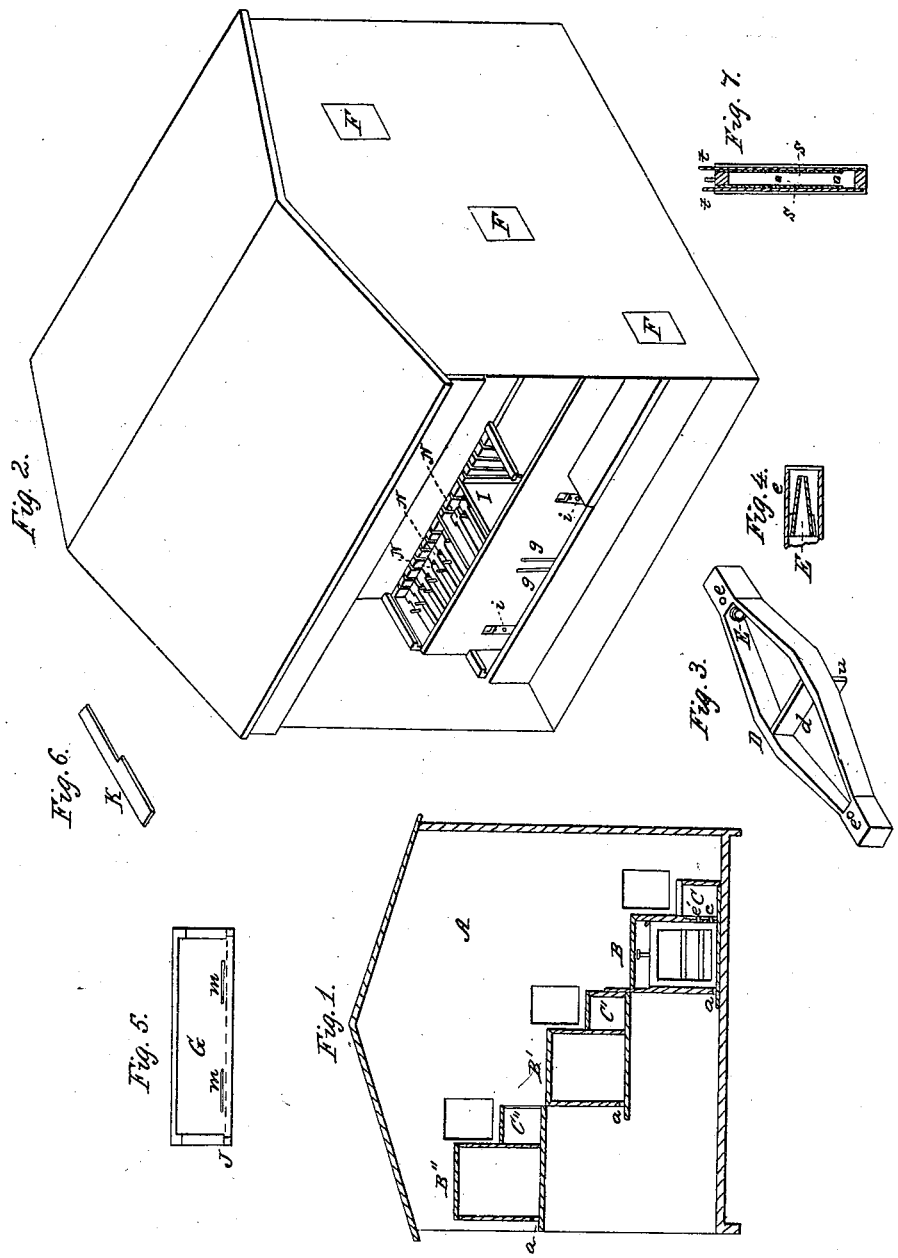
Witnesses:
C. M. Alexander
A. A. Geatman
Inventor:
John W. Palmer

UNITED STATES PATENT OFFICE.

JOHN W. PALMER, OF PORT REPUBLIC, VIRGINIA.

BEEHIVE.

Specification of Letters Patent No. 25,979, dated November 1, 1859.

*To all whom it may concern:*

Be it known that I, JNO. W. PALMER, of Port Republic, in the county of Rockingham and State of Virginia, have invented certain new and useful Improvements in Beehives; and I do hereby declare that the following is a full, clear, and exact description of the same, reference being had to the accompanying drawings and to the letters of reference marked thereon.

The nature of my invention consists in arranging and constructing bee hives substantially in the manner herein after described.

In the annexed drawings—Figure 1 is a vertical cross section. Fig. 2, is a perspective of the bee palace and one hive. Fig. 3, represents two separating boxes. Fig. 4, is a section of one end of the feeding box. Fig. 5, is a top view of one of the hives. Fig. 6, is a perspective of a slide used in separating the bees.

In the figures A represents a bee-palace, which may be made of any convenient size, being made to hold as many hives as the owner may desire to keep. The hives placed in this palace are represented by B, B', B'', being located one above the other in the form of stair-steps, as is represented in Fig. 1. These hives consist of oblong boxes made of any suitable size and divided in the center by a vertical partition marked I, as seen in Fig. 2, connected to each hive is an oblong box made smaller than the hive, in which is contained an adjustable separating box. The oblong boxes are marked C, C', C'', and the separating boxes contained in these boxes are marked (D) only one of which is shown however. When the separating box D is placed in the box C the division (u) divides the said box C into two feeding apartments. The side J of the hive, which is presented to the box C, is provided with two long apertures $g$, $g$,—said side J is also provided with two openings which are regulated by means of a slide $i$, said openings are marked $c$, and $c'$, and are seen in Fig. 1.

D represents the separating box which is divided in two parts by means of a division $d$. In each end of this separating box D there is an opening in which is secured a hollow frustum of a cone, the base or large portions of these frusta being turned toward each other.

Fig. 4, represents a section of the end of the box D and frustum E. There is sufficient space left between the small end of the frustum and the sides of the opening in which it is placed that a bee may pass around said frustum in the opening without touching the frustum. An opening $e$, is made in the end of box D, which communicates with opening $e'$, in the side of the hive. The object of the frustum $e$, when used in this manner is to prevent the bees from reëntering the box D, after they have passed from it through said frustum and through the opening $e$.

The boxes for containing the honey in this hive are the same as those used in the patent of Jno. K. Leedy. They consist of a frame provided on two sides with perforated slides. These slides do not reach to the bottom of the frame, a sufficient space being left between them and the bottom to allow of a free passage for the bees in and out. When one of these boxes becomes filled with honey, and it is desired to remove the honey from it, two slides $t$, $t$, seen in Fig. 7, are used. These slides $t$, $t$, are pushed down in a groove beside the slides $s$, $s$; covering the perforations in slides $s$, $s$, and at the same time extending down below said slides, and covering the openings at their bottom. This box is then placed in the apartment with which the openings $g$, $g$, communicate, and one, or both, of the long slides $t$, $t$, are drawn out. The separating box D, being placed in feed box C, the bees pass out from the honey comb through openings $g$, $g'$, and into the box D, they thence pass into the frustum and out through openings $e$, and $e'$, into the hive again and go to work again in a new box which is placed in the position of the one which has been removed. When the box D, is placed in the feed box C, the partition $d$, divides the two openings $g$, $g'$, so that the bees may be directed into either of the apartments in the feeding box, which the operator may desire. The slide K, may be shoved down in the hive so as to cover either of the openings $g$, $g'$. By reversing the slide, the bees may be directed to either of the apartments in box D, which may be desired. $a$, $a$, $a$, represent openings in the hives through which the bees enter when working. One great advantage about this arrangement is that the bees always enter the hives, or the opposite side of the bee-palace, from the one, which the honey is removed from.

G represents the top of the hive—this top is provided with narrow air passages m, m, which are placed in such close proximity to the side J that when this top is drawn out slightly, the passages stand over the said side J and are closed by it, but when the top is shoved in a very little, the passages communicate with the hives, and air passages in at the bee entrance a, and crosses diagonally up through the comb to the passages, and out—thus ventilating the hive perfectly.

I do not wish to confine myself to only one partition I, as I may make the hives of any desired length, and use any convenient number of divisions or partitions.

F, F represent windows for ventilating the bee palace. In taking honey from the upper hives it will be understood that the lower hives may be used as steps upon which the operator may stand.

Having thus fully described my invention what I claim as new and desire to secure by Letters Patent is—

Providing the within described bee hives with one or more partitions (I,) with opening a, m, e', c, and g, g', and with feed boxes (C) which contain separating boxes, D, constructed substantially as described the whole being arranged, and used, in the manner, and for the purpose set forth.

JOHN W. PALMER.

Witnesses:
C. M. ALEXANDER,
JOHN K. LEEDY.